United States Patent [19]

Hautemont

[11] 4,335,635

[45] Jun. 22, 1982

[54] DEVICE FOR SEVERING AND TRANSFERRING A LABEL

[75] Inventor: Jean-Claude Hautemont, Gif sur Yvette, France

[73] Assignee: Pak Pro International N.V., Willemstad, Netherlands Antilles

[21] Appl. No.: 142,395

[22] Filed: Apr. 21, 1980

[30] Foreign Application Priority Data

Apr. 27, 1979 [FR] France ................................ 79 10851

[51] Int. Cl.³ ............................................. B65C 9/08
[52] U.S. Cl. ......................................... 83/160; 83/167; 264/509; 425/122; 425/126 R
[58] Field of Search ................... 83/23, 167, 160, 159, 83/158, 96, 103; 425/126 R, 127, 122, 125; 113/80; 53/296–298; 264/509

[56] References Cited

U.S. PATENT DOCUMENTS

| | | | |
|---|---|---|---|
| 2,567,141 | 9/1951 | Andrew et al. | 83/103 X |
| 2,600,393 | 6/1952 | Cohn | 113/80 D |
| 3,292,209 | 12/1966 | Borkmann | 425/126 |
| 3,324,508 | 6/1967 | Dickinson | 425/126 |
| 3,684,418 | 8/1972 | Langecker | 425/126 X |
| 3,768,942 | 10/1973 | Langecker | 425/126 R |

FOREIGN PATENT DOCUMENTS

| | | | |
|---|---|---|---|
| 245545 | 3/1963 | Australia | 264/509 |
| 1586359 | 7/1970 | Fed. Rep. of Germany . | |
| 1901473 | 8/1970 | Fed. Rep. of Germany | 264/509 |
| 659264 | 10/1951 | United Kingdom . | |

Primary Examiner—James M. Meister
Attorney, Agent, or Firm—Nathaniel A. Humphries

[57] ABSTRACT

The present invention relates to a device for severing and transferring a label, wherein the transfer device comprises, on the one hand, for the free end of the label web, a receiver member provided with elements for mechanically holding the edges of the web, and mounted downstream of the severing device on a support which is movable along a straight line transverse with respect to the web between the position of reception of the web end and the immediate vicinity of one of the open parts of the mold and, on the other hand, a pneumatically controlled push member sliding in the support and intended for expelling the severed label from the receiver member and for pushing it against the lateral face of a mold part when this member is in the immediate vicinity of the part.

8 Claims, 8 Drawing Figures

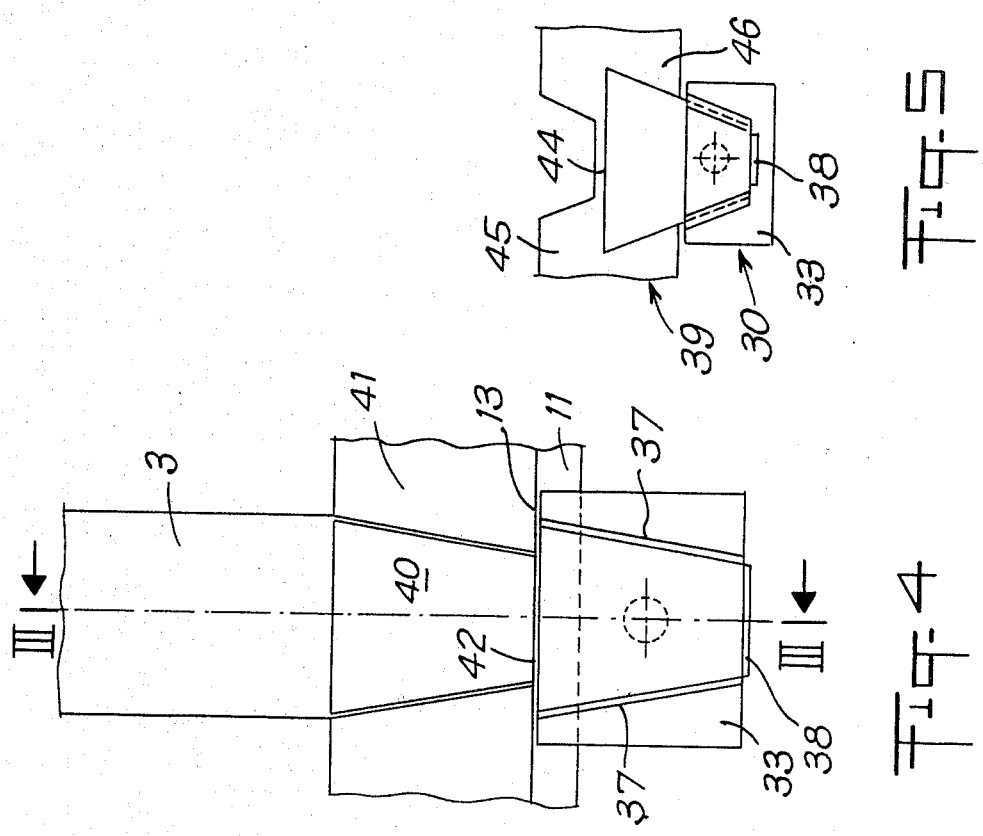
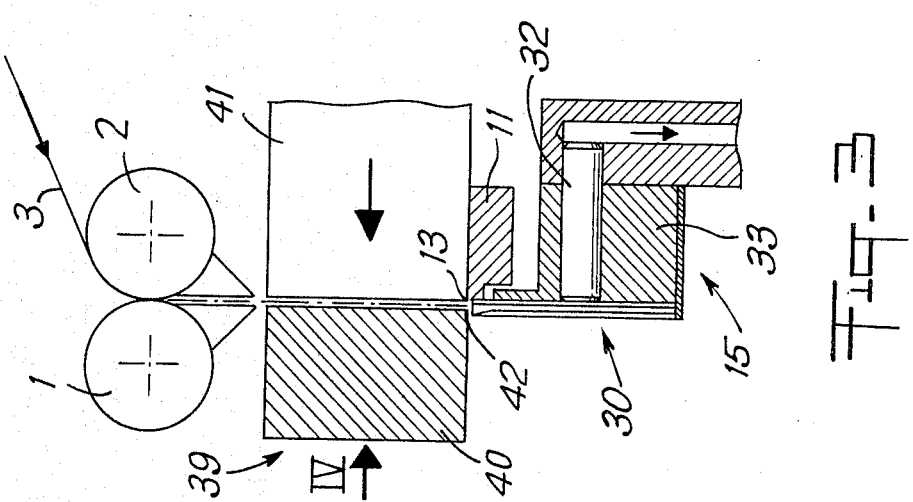

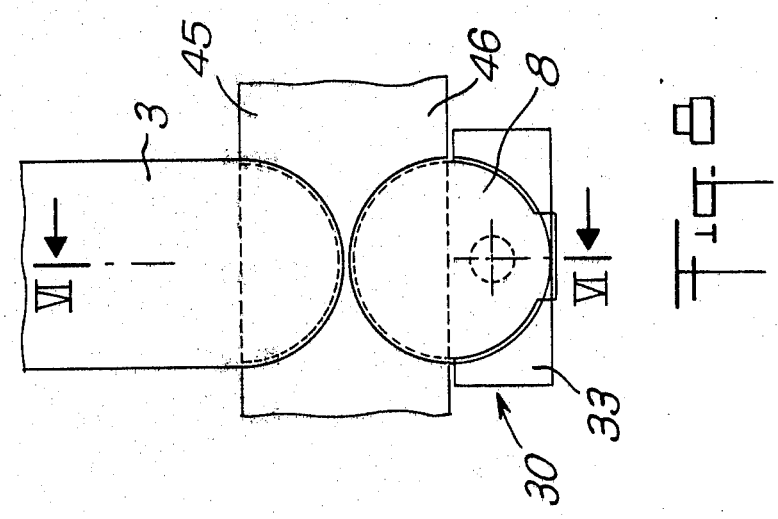
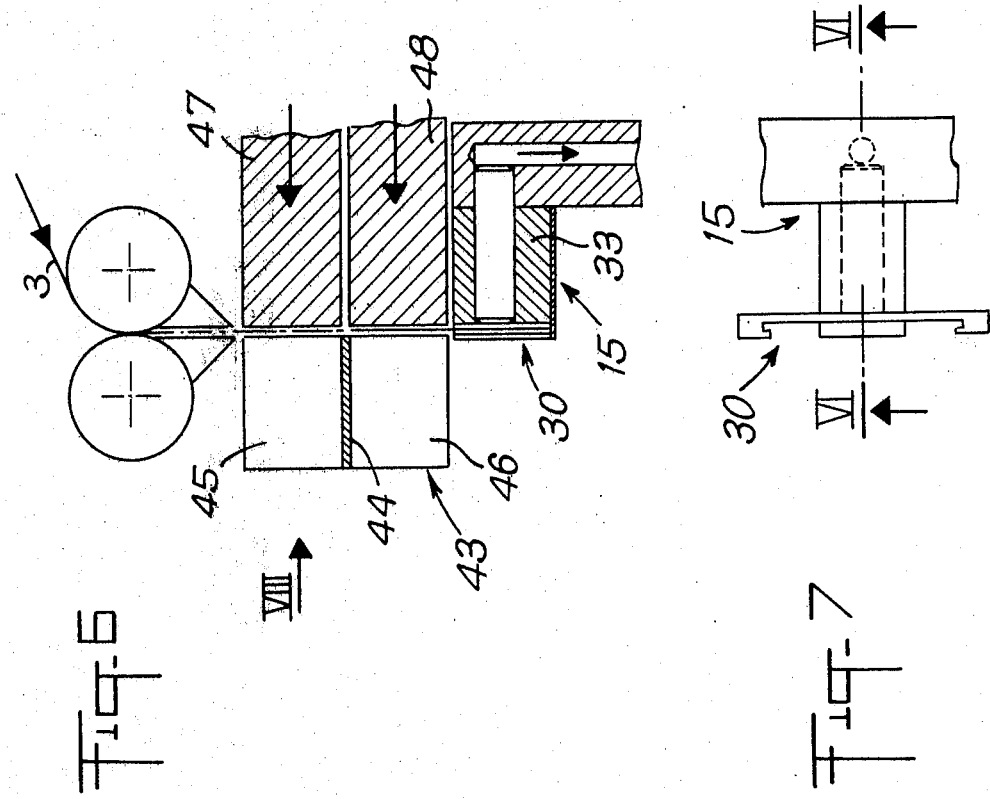

DEVICE FOR SEVERING AND TRANSFERRING A LABEL

The present invention relates to a device for severing and transferring a label from a web of labels, of the type comprising rolls for feeding the label web, means for transversely severing and/or stamping said web to separate at least one portion of label therefrom, and transfer means adapted to seize the label at the latest at the moment when it is severed and/or stamped and to transfer it to the lateral face of the shaping chamber of a mold presenting a mold body composed of at least two parts separable from each other, preferably in height, to render accessible at least one part of said lateral face, provided with suction orifices, to said transfer means which are movable at least transversely to the axis of the shaping chamber and parallel to the direction of severance and/or stamping of the label.

Such a device is known, for example, by U.S. Pat. No. 3,324,508 and molds composed of two parts separable particularly in height are disclosed in French Pat. No. 2,256,818. According to the embodiment of U.S. Pat. No. 3,324,508, the label is wedged between a support element and a suction head of the transfer means which, after the label has been severed, hold it until it is transferred to the lateral face of the shaping chamber of part of the mold body. The drawbacks of this known embodiment consist in a transfer path broken in at least two orthogonal directions between the support element and the lateral wall of the shaping chamber and in the maintenance of the vacuum at the suction head during the transfer and the elimination, which is as rapid as possible, of the vacuum at the level of this suction head at the moment of application of the label against the lateral face of the shaping chamber. The use of the vacuum and the frequent creation and interruption of this vacuum, as well as the transfer of the label in at least two orthogonal directions prevent a rapid transfer and a precise positioning of the label.

In another device described in French Pat. No. 2,338,191, the label, once it has been severed, is pushed to one side in the direction of a suction spindle around which it is wound; the truncated lateral wall of a separable mold then descends and surrounds the spindle which releases the label; this known device has the drawback of requiring a special truncated shape of the containers, a special shape of the labels which must cover the wall of the mold entirely, a delicate choice of the rigidity of the labels which must be rigid enough so as not to fold or crumple when they are pushed laterally and flexible enough to wind around the suction spindle; finally, as in the preceding device, the frequent creation and interruption of the vacuum, the perfect synchronisation of the different transfer members and the non-rectilinear path of said members complicate the construction of the apparatus and lengthen the time necessary for manufacturing and labelling a container.

Although it is fairly remote from the object of the invention, U.S. Pat. No. 3,151,193 describes a device intended for placing on the walls of a shaping mold a printed label having to cover an article formed by molding. However, such a device is exclusively designed for labels made from a film of supple plastics material of determined shape and could not be suitable for example for paper labels of any shape.

It is an object of the present invention to eliminate the drawbacks encountered in the devices of the prior art.

This object is attained in that the transfer means comprise, on the one hand, for the free end of the label web, a receiver member provided with elements for mechanically holding the edges of the free end of said web, and mounted downstream of the severing and/or stamping means, on a support which moves along a straight line transverse with respect to said web end, between its position where it receives the web end and the immediate vicinity of one of the open parts of the mold body, and, on the other hand, an expelling push member mounted to slide parallel to said straight line in said pneumatically controlled movable support and adapted to expel the severed label from the receiver member and to push it against said lateral face of a mold part when this receiver member is in the immediate vicinity of said open mold part.

Due to this design, the label is firstly held in the transfer means against the effect of gravity, then is moved along a straight line near the lateral face of a shaping chamber portion and, as soon as it is near the corresponding mold part, is extracted at high speed from the receiver member, which has momentarily stopped, in the same direction as the one in which said receiver member was displaced, by the free end of the expelling push member, which is applied against one of the large faces of the label. During this movement of rapid expulsion, the label is maintained applied against said expelling push member without the effect of gravity being able to act, as the volume of air between the label and the lateral face of the shaping chamber escapes more slowly than said label advances. As soon as the label has approached the lateral face of the shaping chamber to within a few tenths of millimeters, it is caught by the effect of suction at the level of said lateral face through the suction channels and orifices connected to a source of vacuum and opening on said lateral face of the shaping chamber. It is this effect of suction which holds the label in place in the mold until it is covered by the sheet of thermoplastic material constituting the labelled pot or container. It goes without saying that the expelling push member is returned into its initial position under the effect of a suction created on its rear end during the return level of the transfer means towards their position for receiving the new end of the label web. As the transverse section of the expelling push member is generally much smaller than the surface of the label, the latter may be deposited on faces which are even considerably curved despite the size of the surface of the label, which curved faces remain quite inaccessible to the elements for mechanically holding the label.

The invention also relates to a method for transferring a label between its receiving position and the lateral face of a laterally accessible shaping chamber part of a mold body comprising at least two parts which are movable with respect to each other.

The method according to the invention is characterized in that, between its position of reception and the lateral face of the shaping chamber, the label is moved exclusively along a rectilinear path and, over a first part of this path, said label is held and supported by first mechanical means against the effect of gravity and, over the second part of said path, the label is extracted from the first mechanical means, by being pushed with the aid of a second means so rapidly that the volume of air between said label and said lateral face escapes with a sufficient resistance to hold said label against said second means against the force of gravity until said label is held on said lateral face.

The invention will be more readily understood on reading the following description with reference to the accompanying drawings, in which:

FIG. 3 is a view in longitudinal, vertical section through a second embodiment of the severing and transfer device, along line III—III of FIG. 4.

FIG. 4 is a front elevational view of the device, in the direction of arrow IV of FIG. 3.

FIG. 5 is a front elevational view of a third embodiment of the severing and transfer device.

FIG. 6 is a view in longitudinal, vertical section through a fourth embodiment of the device, along line VI—VI of FIGS. 7 and 8.

FIG. 7 is a plan view of a plurality of elements of said device, and

FIG. 8 is a front elevational view of the device in the direction of arrow VIII of FIG. 6.

Figure 1:
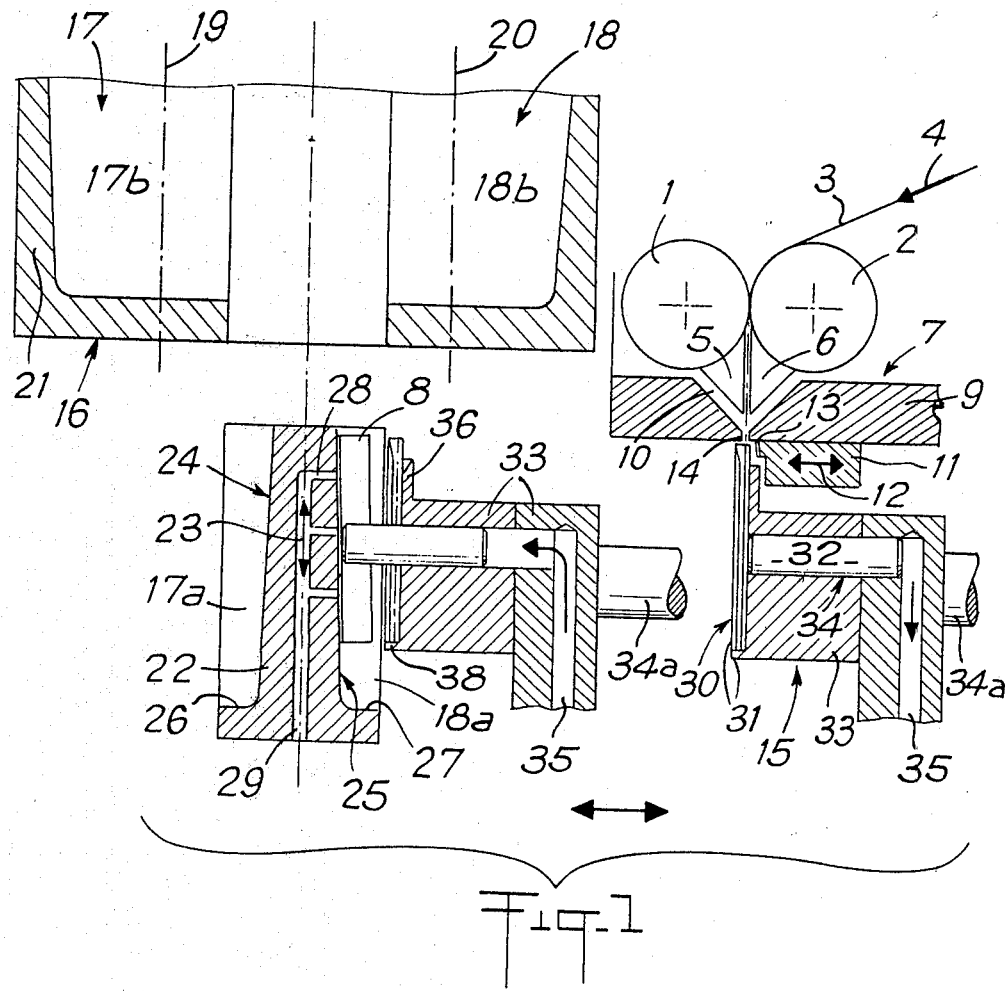
FIG. 1 is a view in longitudinal, vertical section through the severing and transfer device associated with a mold whose body is composed of a plurality of parts which are vertically mobile with respect to one another, certain elements of said device being shown in their two extreme positions and said section being made along line I—I of FIG. 2.
Figure 2:
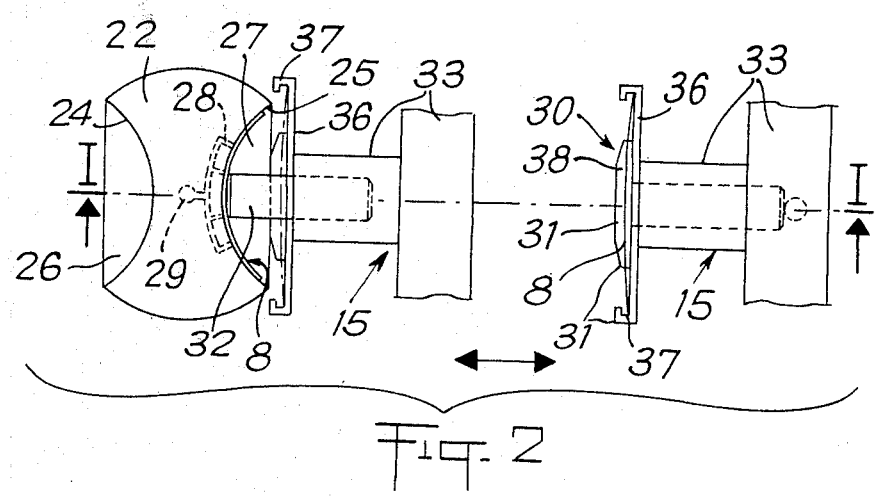
FIG. 2 is a plan view of certain elements of the severing and transfer device, which elements are also shown in their two extreme positions.

Referring now to the drawings, FIGS. 1 and 2 show a device for severing and transferring a label, which comprises at least one pair of feed rolls 1, 2 which hold tightly and advance, step by step, a web of labels 3 in the direction of arrow 4. Below the feed rolls 1,2, the label web 3 passes between guides 5, 6 which guide said web vertically towards the transverse severing means 7 possibly completed by transverse stamping means (cf. FIGS. 3 to 8) enabling a label 8 to be separated from said label web 3. The transverse severing means 7 are composed, in the case of the embodiment shown in FIG. 1, of a fixed blade 9 provided with a slot 10 in which penetrate the guide members 5, 6 and through which the free end of the label web 3 passes. Below the blade 9 and near the narrowed part of the slot 10 there is provided a cutter 11 movable transversely with respect to the vertical part of the label web 3 in the directions of the double arrow 12 and cooperating by its front cutting edge 13 with a corresponding edge 14 of the slot 10.

The severing and transfer device also comprises transfer means 15 which may grip the label, or more precisely the free end of the label web 3, at the latest at the moment when the label 8 is severed (and/or stamped) and which may transfer it from the so-called receiving extreme position (to the right in FIGS. 1 and 2) towards a position of application (to the left in FIGS. 1 and 2), i.e. to the lateral face of the shaping chamber of a mold.

The device for severing and transferring a label is associated with at least one shaping chamber of a mold comprising a mold body composed of at least two parts separable from each other, preferably in height and vertically. Molds of this type are described for example in U.S. Pat. No. 3,108,850, and do not form part of the object of the present invention per se.

FIGS. 1 and 2 show a mold body 16 comprising two rows of shaping chambers 17, 18 which are upwardly open and whose axes 19, 20 are vertical. The mold body 16 is movable vertically between a high position (not shown), called shaping position, and a low position shown in FIG. 1, called demolding position. The mold body 16 is composed of two mold body parts 21, 22 which are movable with respect to each other in height and, in the present case, vertically between the demolding position and the label application position. The second part of the mold 22 shown in FIG. 1 in its low position comprises for each shaping chamber 17, 18 a shaping chamber part 17a and 18a which when the part of the mold 22 has joined the part of the mold 21, completes the chamber part 17b, 18b to form the shaping chamber 17, 18. According to the embodiment shown in FIG. 1, the part of the mold 22 vertically movable in the directions of double arrow 23 is a sort of partition separating the two shaping chambers 17, 18 and comprises a lateral face 24,25 and a part of the bottom 26, 27 of the shaping chamber 17,18. Suction channels 28 permanently connected to a source of vacuum or alternately to a source of vacuum and to the atmosphere, open out on the lateral face 24,25.

The transfer means 15 capable of gripping the free end of the label web 3 and subsequently the label 8 comprise, on the one hand, a receiver member 30 provided with mechanical holding elements 31 which hold the edges of the free end of the web 3 and subsequently the edges of the label 8 and, on the other hand, an expelling push member 32 sliding in a support 33 on which is fixed the receiver member 30 and which is itself movable and mounted for example on a transfer rod 34a which is mobile transversely and, more precisely, perpendicularly to the axis 19, 20 of the shaping chambers 17, 18 and to the free end of the label web 3, and parallel to the direction of severing and/or stamping of the label 8. The expelling push member 32 is mounted in a bore 34 in the mobile support and may move parallel to the direction of said mobile support 33. The rear face of the expelling push member 32 is connected through a conduit 35 alternately to a source of pressurized air and to a source of vacuum, and consequently is controlled pneumatically. When, at the end of advance stroke of the mobile support 33 and the mechanical holding means 31 (cf. left-hand side of FIGS. 1 and 2), the connection of the rear face of the push member 32 with the source of vacuum is interrupted and it is connected to the source of pressurized air, said push member is displaced sharply towards the left and, in its movement, takes the label 8 along in front of it, firstly extracting it from the mechanical holding elements 30, 31 and then applying it against the lateral face 25 or 24 of the lowered part 22 of the mold 16.

FIGS. 1 and 2 very clearly show that the transfer means 15 move exclusively over one rectilinear path between their two extreme positions and that the path of the expelling push member 32 is parallel to the direction of the rectilinear path of the mobile support 33 bearing the mechanical holding elements 31. As may be seen in FIG. 1, the transfer means 15 are mounted downstream of the severing means 7 and are arranged so as to be able to retain the label 8 against a forward or rearward tilting and against the force of gravity.

The receiver member 30 comprises a lateral wall 36 which is vertical and parallel to the end of the label web 3. This lateral wall 36 is mounted on the mobile support 33.

The mechanical holding elements 31 which are fixed with respect to the mobile support 33 and which comprise no mobile element, comprise at least two guides 37 which extend parallel to the lateral wall 36, are opposite one another, have a transverse section which is, for example U-shaped, and are upwardly open.

Below these guides 37, the mechanical holding elements 31 comprise an end shoulder 38 likewise fixed on the mobile support 33. Due to this arrangement, the three edges of the free end of the label web 3 and subsequently three of the four edges of the severed label 8 are held on the transfer means 15 without the intervention of any pneumatic means. The lateral wall 36 comprises a bore which is aligned with the bore or the housing 34 of the expelling push member 32 in the mobile support 33.

It should be noted that the dimensions of the transverse section of the push member 32 are relatively small with respect to the surface of the label 8. This makes it possible for the push member 32 to penetrate in highly curved concave chamber parts and to deposit a label 8 therein without the mechanical holding elements being obliged likewise to penetrate in the concave part of the shaping chamber and defined by the lateral face 25.

As mentioned previously, the expulsion of the label 8 from the receiver member 30 and the mechanical holding elements 31 in the direction of the lateral face 25 of the shaping chamber 18 is effected with such a rapidity that the volume of air between the label 8 and the lateral face 25 exerts a certain counterpressure on the label 8 and holds it against the front end of the expelling push member 32 until said label 8 has come sufficiently close to the lateral face 25 to be able to be caught and sucked by the effect of the depression produced at the suction channels 28 provided in the part of the mold body 22 provided with said lateral face 25.

As may be seen in FIG. 1, at the top end and near the severing means 7, the outer flange of the guides 37 and the lateral wall 36 of the mechanical holding elements 31 are bevelled in the direction of the lower end of the label web 3, on the one hand, and the inner shoulder 38, on the other hand.

The severing means 7 provided for the embodiment shown in FIGS. 1 and 2 are not combined with stamping means and therefore produce only a rectangular label. FIGS. 3 and 4 show an embodiment which comprises, downstream of the feed rolls 1 and 2, stamping means 39 mounted upstream of the transverse severing cutter 11. These stamping means 39 comprise a stamp 40 and a die 41 which, with respect to the free end of the label web 3 are disposed on the same side as the severing cutter 11 and the mobile support 33 of the transfer means in reception position. The stamp 40 is disposed on the side of the mold body 16 which has not been shown and is fixed, whilst the die 41 is movable and carries the severing cutter 11 whose cutting edge 13 cooperates with the lower edge 42 of the stamp 40 to sever the label 8 engaged in the receiver member of the transfer means 15. The stamping means 39 must here serve to sever the oblique lateral edges of the label 8. In this case, the lateral guide 37 of the holding elements are adapted to the shape of the edges of the label 8 and the distance between the top ends of the lateral guides 37 is then greater than that of the lower ends of said guides 37.

According to the embodiments shown, the receiver member 30 has a height which is at least slightly less than the height of a label and, preferably, at the most equal to half the height of a label 8. In this case, the severing and stamping means 43 are disposed immediately upstream of the receiver member 30 and comprise for one label two dies 45, 46 which are semi-cylindrical or semi-prismatic in form and mounted back to back and two corresponding stamps 47, 48 likewise semi-cylindrical or semi-prismatic in form. In this case, the dies 45, 46 are in fixed position near the mold body 16 which has not been shown and the stamps 47, 48 are movable and disposed with respect to the label web 3 on the same side as the movable support 33 of the transfer means 15 in position of reception of the lower end of the label web 3.

As may be seen in FIGS. 5 to 8, the two dies 45, 46 and the two stamps 47, 48 are juxtaposed in height and intended to stamp, in each operation, two label parts which complete each other to form a single label, one of which belongs to a first lower label and the other to the following upper label. The two dies 45, 46 are separated by a wall 44 which forms on its edges the severing edges cooperating with the stamps 47, 48 in order, on the one hand, to sever from the label web 3 the upper part of the label already engaged in the receiver member 30 and, on the other hand, to stamp the lower part of the following label, which part will momentarily constitute the free end of the label web 3.

The embodiment of the severing and stamping means 39 is intended to stamp labels of trapezoidal form whilst the embodiment shown in FIGS. 6 to 8 is intended for stamping labels 8 of circular form. Of course, severing and stamping means may be provided which give the labels another shape. In the case of these two latter embodiments (FIGS. 5 to 8), the lower die 46 serves as passage for the upper part of the label 8 when it is transferred to the lateral face 25 from the position of reception of the transfer means 15.

The present invention is not limited to the embodiments described hereinabove but covers on the contrary all the variants which may be made without departing from the scope thereof as defined hereinafter by the appended claims.

What is claimed is:

1. In a device for severing and transferring a label from a web of labels, of the type comprising rolls for feeding the label web, means for transversely severing said web in order to separate a label therefrom and transfer means adapted to seize the label at the latest at the moment of severing thereof and to transfer it to the lateral face of the forming chamber of a mold presenting a mold body composed of at least two parts which are provided with suction orifices, and separable from each other in height, so as to render accessible at least one part of said lateral face, to said transfer means which are movable at least transversely with respect to the axis of the forming chamber and parallel to the direction of severing of the label, the transfer means comprise, on the one hand, for the free end of the label web, a receiver member provided with elements for mechanically holding the edges of the free end of said web, and mounted downstream of the severing means, on a support which is movable exclusively along a straight line transverse with respect to said web end, between the position of reception of the web end and the immediate vicinity of one of the open parts of the mold body, and, on the other hand, a pneumatically controlled expelling push member mounted to slide parallel to said straight line in said mobile support, intended for expelling the severed label from the receiver member and for pushing it against said lateral face of an open mold part when this receiver member is in the immediate vicinity of said open mold part.

2. The device of claim 1 wherein the receiver member comprises a lateral wall parallel to the end of the label web, and mounted on the mobile suport, and the mechanical holding elements comprise at least one lateral guide whose transverse section is in the form of an upwardly open U, and an end shoulder, this wall being provided with a bore through which may pass the expelling push member mounted in said mobile support in a housing aligned with said bore and capable of being connected alternately to a source of pressurised air and a source of vacuum.

3. The device of claim 2, wherein the holding elements comprise two lateral guides whose shape is adapted to those of the edges of the label, the distance between the upper ends of the lateral guides being equal to or greater than that of the lower ends of said guides.

4. The device of claim 3, wherein the height of the receiving member and its guides is at least slightly less than the height of a label.

5. The device of claim 1, wherein the severing means comprise a cutter which is disposed upstream of the mobile support at a level corresponding to the height of the label to be severed from the end of the label web, said end engaged in the receiver member and which constitutes the lower edge of a die cooperating with a stamp to stamp for each label the lateral edges of the label web.

6. The device of claim 5, wherein the cutter, the die and the mobile support in position of reception are disposed on the same side of the label web, whilst the stamp is located on the other side of said web and in the vicinity of the mold body.

7. The device of claim 1, wherein the receiver member presents a height which is less than and at the most equal to half the height of a label and the severing and stamping means disposed immediately upstream of the receiver member comprising for a label two dies mounted back to back and two corresponding stamps, the two dies and the two stamps, juxtaposed, are adapted to stamp at each operation two parts of two successive labels completing each other to form a single label, one of which belongs to a first label and the other to the following label and the two dies are separated by a wall forming on its edges the severing edges cooperating with said stamps in order, on the one hand, to sever from the label web the upper part of the label already engaged in the receiver member and, on the other hand, to stamp the lower part of the following label, which part will momentarily constitute the free end of the label web.

8. The device of claim 7, wherein a die is disposed near a part of the mold body.

* * * * *